(12) United States Patent
Usuda et al.

(10) Patent No.: US 7,526,122 B2
(45) Date of Patent: Apr. 28, 2009

(54) INFORMATION INPUTTING/SPECIFYING METHOD AND INFORMATION INPUTTING/SPECIFYING DEVICE

(75) Inventors: Hiroshi Usuda, Tokyo (JP); Masanori Idesawa, Saitama (JP)

(73) Assignee: Sony Corporation (JP)

( * ) Notice: Subject to any disclaimer, the term of this patent is extended or adjusted under 35 U.S.C. 154(b) by 552 days.

(21) Appl. No.: 10/363,634

(22) PCT Filed: Jul. 11, 2002

(86) PCT No.: PCT/JP02/07071

§ 371 (c)(1),
(2), (4) Date: Jul. 29, 2003

(87) PCT Pub. No.: WO03/007137

PCT Pub. Date: Jan. 23, 2003

(65) Prior Publication Data

US 2004/0061725 A1   Apr. 1, 2004

(30) Foreign Application Priority Data

Jul. 12, 2001   (JP) .............................. 2001-212875

(51) Int. Cl.
*G06K 9/62* (2006.01)
(52) U.S. Cl. ...................................... 382/159; 382/181
(58) Field of Classification Search ................. 382/113, 382/141, 143, 159, 181; 345/158
See application file for complete search history.

(56) References Cited

U.S. PATENT DOCUMENTS

| 5,200,845 | A | * | 4/1993 | Crooker et al. | ............... | 349/175 |
| 5,594,469 | A | * | 1/1997 | Freeman et al. | ............. | 345/158 |
| 5,962,455 | A | | 10/1999 | Blum et al. | | |
| 6,115,513 | A | * | 9/2000 | Miyazaki et al. | ............ | 382/317 |
| 6,650,776 | B2 | * | 11/2003 | Ihara et al. | .................. | 382/181 |
| 6,782,119 | B1 | * | 8/2004 | Barlett | ........................ | 382/113 |

FOREIGN PATENT DOCUMENTS

| EP | 0844552 | A1 | * | 11/1997 |
| EP | 0969403 | A2 | * | 1/2000 |
| EP | 0 984 349 | A2 | | 3/2000 |
| JP | 10-214318 | A | | 8/1998 |
| JP | 10-254802 | A | | 9/1998 |
| JP | 2000-132485 | A | | 5/2000 |
| JP | 2000-148336 | A1 | | 5/2000 |
| JP | 2000-148372 | A1 | | 5/2000 |
| JP | 2000-207097 | A1 | | 7/2000 |
| JP | 2000-207338 | A | | 7/2000 |

(Continued)

*Primary Examiner*—Tom Y Lu
(74) *Attorney, Agent, or Firm*—Lerner, David, Littenberg, Krumholz & Mentlik, LLP

(57) ABSTRACT

An object surface is imaged by an imaging unit (11) and, based on the imaging information by the imaging unit (11), the information corresponding to the object is read out and recognized to identify the object, as an object identification code indicating the information set corresponding to the object stored in the storage unit (14) and the information for specifying the information in the information set corresponding to the object are matched to a position on the object surface by an imaging unit (12) and a controller (13). In this manner, the knowledge stored in the information system can be freely accessed without producing break points, if the knowledge is to be used.

1 Claim, 18 Drawing Sheets

FOREIGN PATENT DOCUMENTS

| | | |
|---|---|---|
| JP | 2000-259533 A | 9/2000 |
| JP | 2001-075971 A1 | 3/2001 |
| JP | 2001-117841 A | 4/2001 |
| JP | 2001-184141 A | 7/2001 |
| JP | 2001-515250 T | 9/2001 |
| JP | 2001-525150 A | 9/2001 |
| JP | 2002-501644 A | 1/2002 |
| JP | 2002-533847 A | 10/2002 |
| WO | WO-98/51036 A1 | 11/1998 |
| WO | WO-99/12116 A1 | 3/1999 |
| WO | WO-00/39742 A1 | 7/2000 |

* cited by examiner

INFORMATION INPUTTING/SPECIFYING METHOD AND INFORMATION INPUTTING/SPECIFYING DEVICE

TECHNICAL FIELD

This invention relates to information inputting and specifying methods and apparatus employing picture recognition.

BACKGROUND ART

As a device which, by combining the functions of pre-existing AV (audio visual) equipment, information equipment or communication equipment, enables the inputting/outputting of the multi-media information, there are currently provided a variety of multi-media equipment, such as a portable information terminal, having a communication function, a VTR (video tape recorder) with a built-in camera, having the communication function, or a personal computer loaded not only with the communication functions but also with the AV functions. The construction of a multi-media system, in which a variety of multi-media equipment are interconnected over a wired communication network, such as Ethernet, a token ring or an ATM, or a wireless communication network, such as infrared ray communication, PHS communication or satellite communication, is proceeding.

In the conventional multi-media equipment, the keyboard, mouse, touch panel, dedicated controller or the microphone, used as input devices for a personal computer, are directly used as the inputting devices. In these inputting devices, all of the clues for information inputting and instructions are in the computer, such that, in a boundary between the objects lying in a sphere of human living environment and computer data, there exists a significant barrier or partition which tends to obstruct continuous thought of the human being.

It may be currently estimated that the access to the Internet under utilization of a portable terminal represented by the iMode performs an important role. In a portable information terminal, represented first of all by a portable telephone set, a multi-function key and a jog key for telephone are adopted in view of limitations on the space occupied by the terminal device and the operating constraint imposed by the telephone set. Thus, for inputting a key word for WEB retrieval and for inputting site addresses, the user is required to be skilled in the operation of the multi-function key, which means considerable difficulties especially for beginners.

That is, the operating methods for inputting devices, such as keyboards, mouses, touch panels, dedicated controllers or microphones, used as inputting devices for conventional multi-media equipment, cannot be said to be matched to the senses of the human being. For users not versed in the computer operations, the operating method cannot be envisioned intuitively, such that specialized knowledge and training are required for comprehending the operating methods.

Additionally, the human being relies upon various objects lying in the three-dimensional space as a clue for memorization or thinking, such that, when the user thinks in the three-dimensional living environment or exploits the knowledge stored in the information system, it is desirable that an information system inherently supporting the intellectual activities of the human being can be easily accessed in a manner not producing breaking points.

DISCLOSURE OF THE INVENTION

It is therefore an object of the present invention to provide information inputting and specifying methods and apparatus in which the knowledge stored in the information system can be freely accessed without producing break points.

According to the present invention, the objects lying in the user's living environment are associated with a set of the information stored in an information system, an object discriminating code indicating the information set corresponding to the objects and which is stored in a storage device of the information system is added to the surface of each object, so that the information for specifying the information in the information set corresponding to the object is matched to a position on the object surface in such a manner that the information corresponding to the object is automatically read out and recognized to identify the object and also in such a manner that the information set in the storage device and the information in the information set will be specified and selected by specifying the position on the object surface.

That is, by associating an object with the information set stored in the information system, it is possible for the human user to specify and select the targeted information set, by indicating the object, without becoming dissociated from his or her living environment. Additionally, the human user is able to specify and select the necessary information in the information set as selected by specifying a position on the object in a state close to a spontaneous state as if the information is provided in his or her living environment.

The present invention provides an information inputting and specifying method including matching an object identification code, indicating a, set of the information corresponding to the object, and the information for specifying the information in the information set corresponding to the object, to the surface of each object, automatically reading out and recognizing the information corresponding to an object for identifying the object, and specifying a position on the object surface to specify and select the information set in the storage device and the information in the information set.

The present invention also provides an information inputting and specifying apparatus including storage means having stored therein a set of information corresponding to an object, object identification code readout means for reading out an object identification code indicating the set of information corresponding to the object stored in the storage means, from the surface of said object, position information detection means for detecting the information, specifying the information in the information set corresponding to the object, as the position information on the surface of the object, and information processing means for recognizing the information corresponding to the object and for identifying the object, by matching the object identification code on the surface of the object specifying the information set corresponding to the object, stored in the storage means, and the information specifying the information in the information set corresponding to the object, to a position on the object surface, based on the object identification code read out by the object identification code readout means and on the position information read out by the position information detection means. The information set in the storage means and the information in the information set are specified and selected by specifying and selecting a position on the object surface.

In the information inputting and specifying apparatus according to the present invention, imaging means for imaging the object surface is provided as the object identification code readout means and as the position information detection means. The information processing means reads out and recognizes the information corresponding to an object, by matching an object identification code, indicating a set of the information corresponding to an object, stored in the storage means, and the information for specifying the information in the information set corresponding to the object, to the surface of the object, for identifying the object.

In the information inputting and specifying apparatus, according to the present invention, the object is a sheet-shaped information inputting medium.

In the information inputting and specifying apparatus according to the present invention, sheet-shaped coordinate inputting means is provided as the position information detecting means. The sheet-shaped coordinate inputting means detects the position information on the sheet-shaped information inputting medium.

In the information inputting and specifying apparatus, according to the present invention, the sheet-shaped coordinate inputting means is formed of a transparent material.

In the information inputting and specifying apparatus according to the present invention, according to the present invention, the sheet-shaped coordinate inputting means is meshed.

In the information inputting and specifying apparatus, according to the present invention, optical information readout means for reading out the object identification code optically readably recorded on the object surface is provided as the object identification code readout means.

In the information inputting and specifying apparatus according to the present invention, magnetic information readout means for reading out the object identification code magnetically readably recorded on the object surface is provided as the object identification code readout means.

BEST MODE FOR CARRYING OUT THE INVENTION

Figure 1:
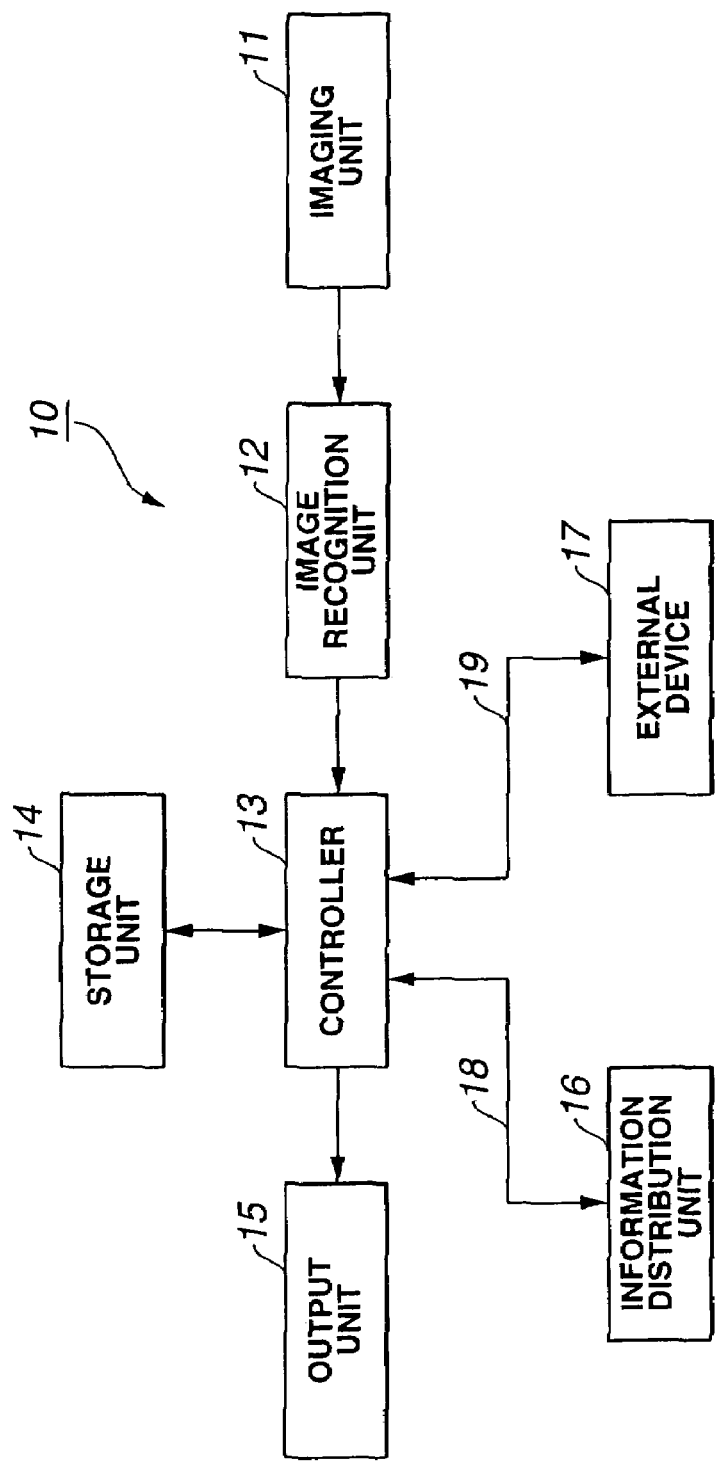
FIG. 1 is a block diagram showing a functional structure of an information inputting and specifying apparatus according to the present invention.

Referring to the drawings, certain preferred embodiments of the present invention are explained in detail.

The present invention is directed to an information inputting and specifying device 10, shown for example in FIG. 1. The information inputting and specifying device 10, shown in FIG. 1, includes an imaging unit 11, an image recognition unit 12, a controller 13, a storage unit 14 and an outputting unit 15. The controller 13 is connected via communication networks 18 and 19, such as a network or a home bus, to an information distributing unit 16 and to an external device 17.

The imaging unit 11 images a recognition object pattern, added to a surface of an object, such as paper sheet, and an access instruction pattern for accessing by for example a finger by a user. Specifically, the imaging unit is comprised of a CCD viewer camera 21, mounted on a viewer 25A, as shown for example in FIG. 2. The CCD viewer camera 21 images an information inputting sheet 29, as set on a media base 28, to which the viewer 25A is mounted upright.

Figure 3:
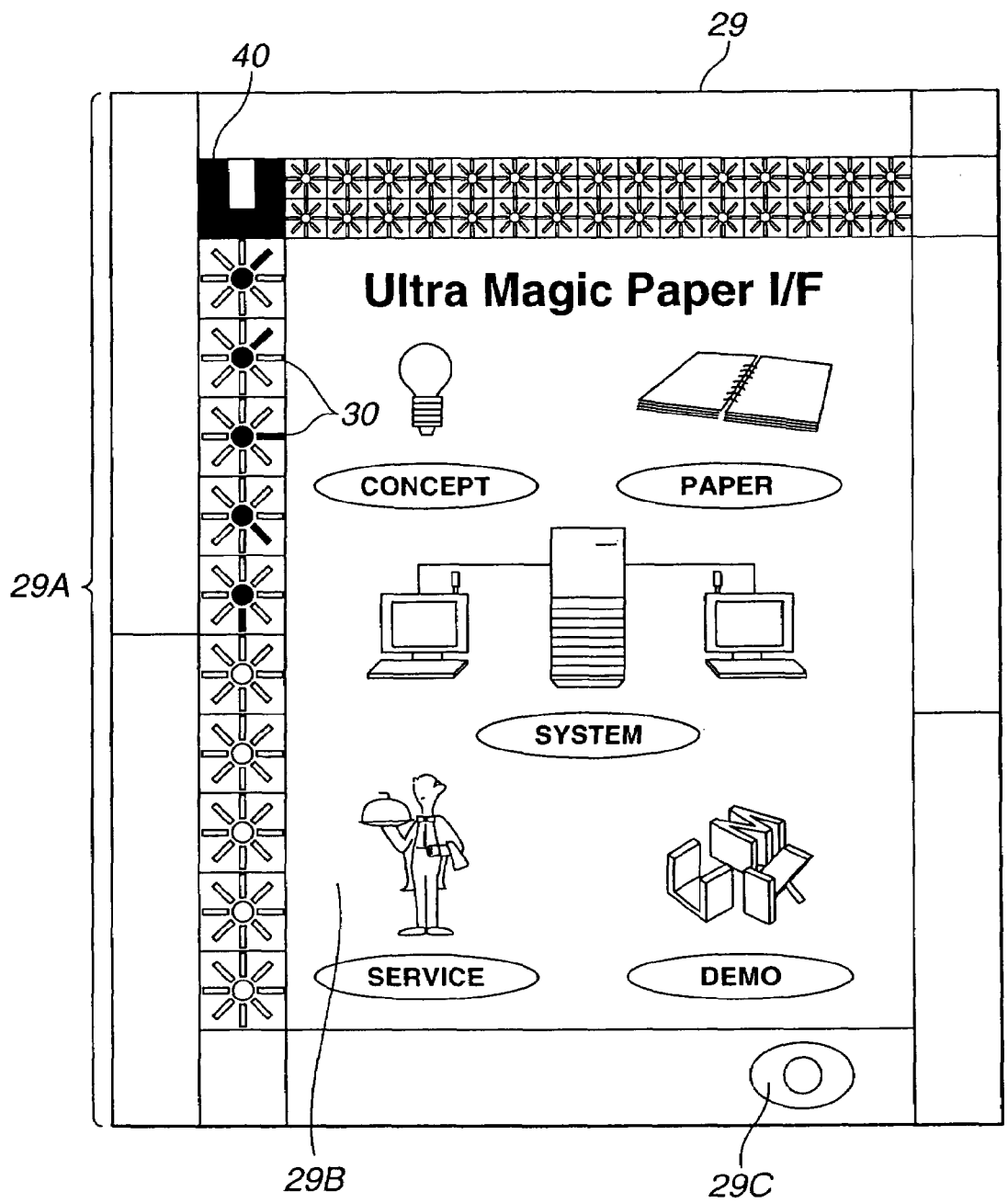
FIG. 3 is a schematic plan view of an information inputting sheet used in the information inputting and specifying apparatus.

The information inputting sheet 29, shown in FIG. 3, is used for controlling the equipment, and includes a display unit 29A for recognition codes for remote control, provided from one equipment type to another or from one equipment to another. The information inputting sheet 29 also includes a display unit 29B of control contents, associated with the equipment type or with the equipment, and a display unit 29C for control stop commands for control contents associated with the equipment type or with the equipment.

Figure 4:
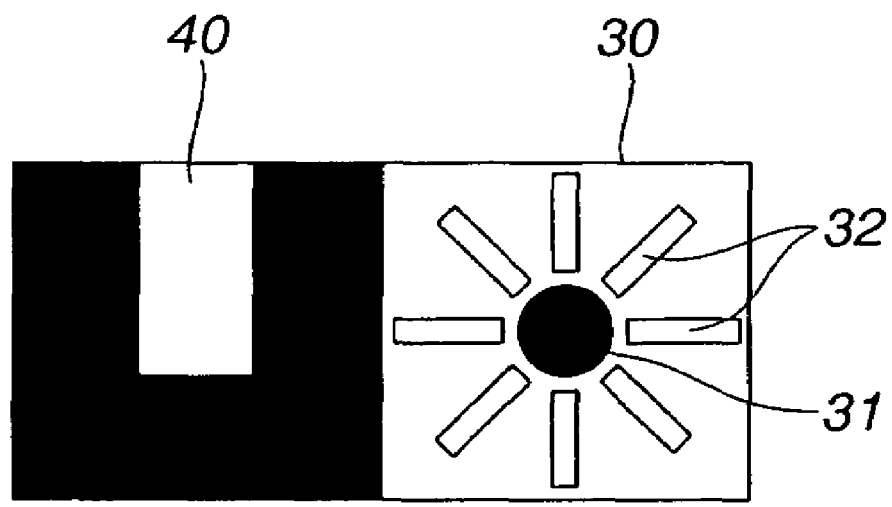
FIG. 4 is a plan view showing the structure of a Umark figure code indicated in the information inputting sheet.

In the display unit 29A for the recognition codes, there is displayed a recognition code 30, referred to below as a Umark-figure code 30, comprised of a circle mark 31 and eight rectangular marks 32, arranged radially therearound for extending in the eight directions, forming a unit of rotational figure elements, as shown in FIG. 4. One unit of the Umark figure code 30 defines eight codes associated with the eight rectangular marks 32.

The Umark figure code 30 is adapted to be used on being selectively daubed in order to permit free definition by the user. Since the Umark figure code is provided with a code detection mark 40, picture recognition may be easily achieved from the code taken alone.

Figure 5B:
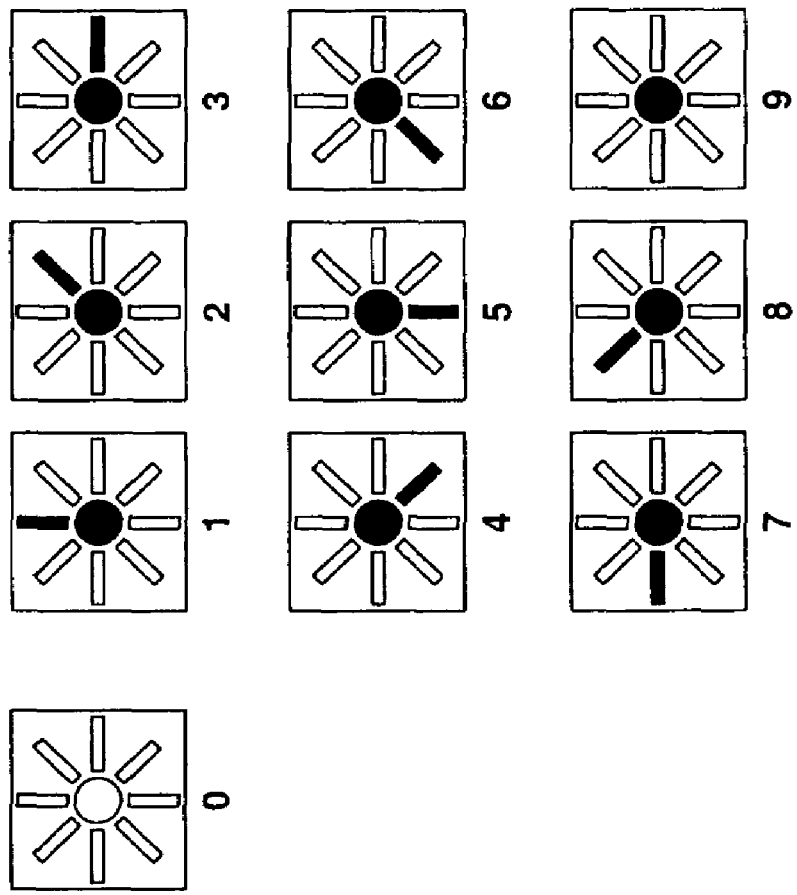
FIGS. 5A and 5B show typical code forms of the Umark figure code
Figure 5A:
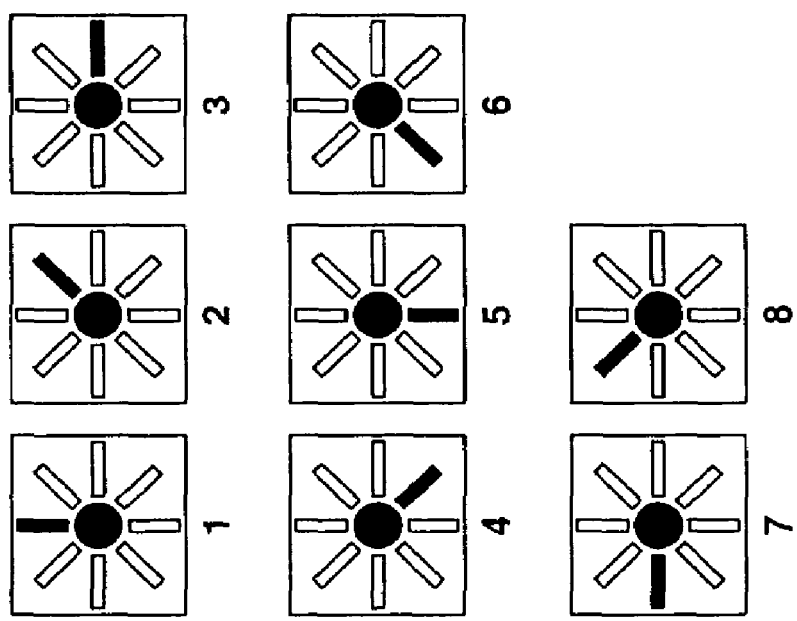

Since one unit of the Umark figure code 30 depends on the figure rotating direction, the base-8 notation, shown in FIG. 5A, is to be the basic notation. However, decimal notation may also be used in order to permit more facilitated recognition by the user.

Figure 6:
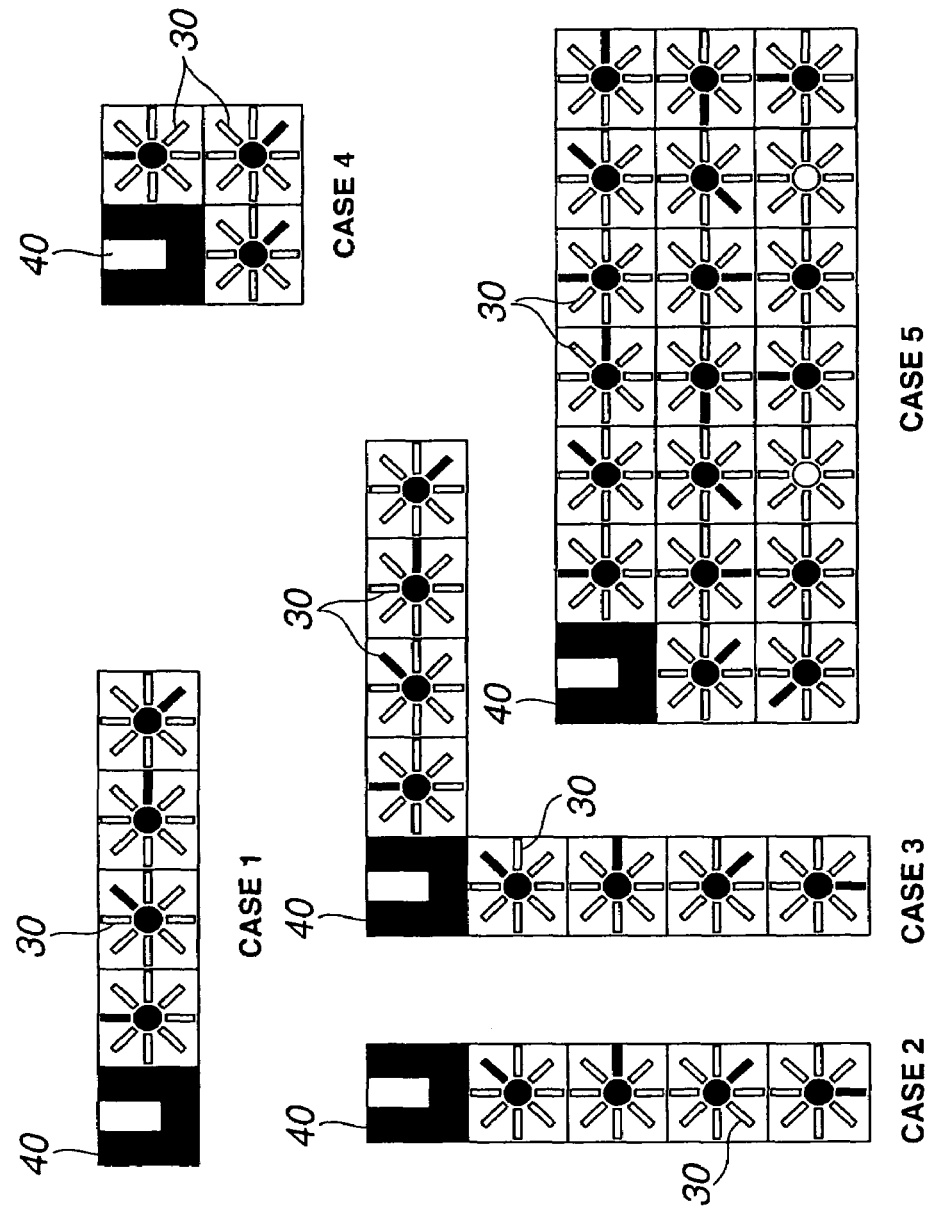
FIG. 6 shows typical arrays of the Umark figure codes.

In actually using the Umark figure code, plural units of the Umark figure code 30 may be combined and arrayed in one direction, that is in the horizontal direction or in the vertical direction, as shown for cases 1 and 2 in FIG. 6. Alternatively, high efficiency code representation, exploiting the blocked arrangements, as shown for the cases 3 to 5 shown in FIG. 6, may be used. The image recognition of the Umark figure code 30 may be achieved readily with the code detection mark 40 as reference.

The image recognition unit 12 recognizes the image information, as picked up by the imaging unit 11. The image recognition unit is supplied with the image information, obtained as the imaged output of the information inputting sheet 29 by the CCD viewer camera 21 shown in FIG. 2. The image recognition unit 12 discriminates and authenticates an object for recognition for the image information obtained as an imaging output of the information inputting sheet 29 by the CCD viewer camera 21 and outputs the results of discrimination and authentication to the controller 13. Following correlation processing with the information corresponding to the results of recognition of the objects for recognition, as later explained, the image recognition unit 12 incidentally recognizes the user input/selection command to output the results of recognition to the controller 13.

The controller 13 controls the information transmission/reception among respective components as follows:

First, the controller checks whether or not the results of recognition of the object for recognition by the image recognition unit 12 may be correlated with the information stored in the storage unit 14. If the correlation with the information held in the storage unit 14 is possible, such correlation with the information held in the storage unit 14 is effectuated. That is, if the correlation of the results of recognition with the information stored in the own device is possible, such correlation is effectuated. If the correlation with the information held in the storage unit 14 is not possible, the results of recognition of the object for recognition by the image recognition unit 12 are sent to the information distributing unit 16 to receive the results of correlation from the information distributing unit 16. In this case, the correlated information is stored in the information distributing unit 16 or in an information processing apparatus present on an external communication network connected to the information distributing unit 16. After the results of recognition of the object for recognition by the image recognition unit 12 have been correlated with the corresponding information, the controller 13 reads in the correlated information into a transient storage unit provided in the controller 13. The information so read in includes, for example, the display information output to and demonstrated in the outputting unit 15, the control information for controlling the external device 17, the link information to the other information, and the constituent information of the information inputting sheet 29. For each subsequent inputting/selecting command from the image recognition unit 12, the authentication processing is performed, the display image is updated and control on the external device 17 is exercised to display the operating contents and the results of information distribution on the outputting unit 15.

The various information read into the transient storage unit of the controller 13 are hereinafter explained.

The display information includes for example the letters or characters, images, layout information and the sound information. Based on this; display information, the controller 13 controls the display on the screen of the outputting unit 15 and the utterance.

The control information includes control commands for controlling the external device 17 when an inputting/instructions are made from the user. The controller 13 controls the external device 17 based on this control information. For example, if the external device 17 is the VTR (video tape recorder), the control information may include the replay control information, stop control information, fast feed control information, rewind control information and the pause control information, for controlling the VTR operation.

The link information includes addresses for reading out the other information stored in the storage unit 14, information distributing unit 16 and in the external information processing apparatus connected to a communication network. The controller 13 performs the processing of reading out the information based on this link information. For example, the URL (Uniform Resource Locator), used in the Internet, may be used as this link information.

The constitution information includes the information for representing what is recorded in the display unit 29B of the information inputting sheet 29 having control contents corresponding to the equipment or the equipment type. Specifically, the constitution information includes the physical positions on the sheet as indicated by the user making the input/selection instructions, and the next processing commands associated with the physical positions. For example, if the position coordinates and the positions are indicated by the user, these position coordinates or the positions are stated in association with the processing commands for executing the aforementioned control information or the link information.

The storage unit 14 memorizes the information correlated with the pattern of the object for recognition. The information stored in the storage unit 14 is the information for controlling the external device 17. These information are transferred to the storage unit 14 using the external information processing apparatus connected to the network via information distributing unit 16 in advance or using satellite communication.

The outputting unit 15 is made up by operating contents by the input/output instructions from the image recognition unit 12, and a display, a loudspeaker or a printer for outputting the results of the information distribution.

The information distributing unit 16 is connected to the controller 13 over a wired communication network, such as Ethernet, a token ring or ATM, or a wireless communication network, such as infrared ray communication, PHS communication or satellite communication. If the correlation by the controller 13 between the results of recognition of the object for recognition by the image recognition unit 12 and the information stored in the storage unit 14 has not been achieved with success, the information distributing unit 16 proceeds to the processing of correlating the results of recognition of the object for recognition and the information stored in the external information processing apparatus connected to the network.

The external device 17 is an equipment controlled by the controller 13 responsive to the inputting/selecting instructions, and is connected to the controller 13 by the wired or wireless communication line.

Specifically, with the information inputting and specifying device 10 of the above-described configuration, the display unit 29A of the equipment-based or equipment type-based remote controlling codes for recognition of the information inputting sheet 29 is read, while the information corresponding to the object may be automatically read out and recognized to identify the object, as the object identification code on the surface of each object indicating the set of the information corresponding to the object and which is stored in a storage system in an information system, and the information for specifying the information in the information set corresponding to the object, are matched to a position of the object surface, to identify the object. The information set in the storage unit and the information in the information set can be specified and selected by specifying the position on the display unit 29B of the information inputting sheet 29 having the control content corresponding to the equipment type or equipment.

Figure 7:
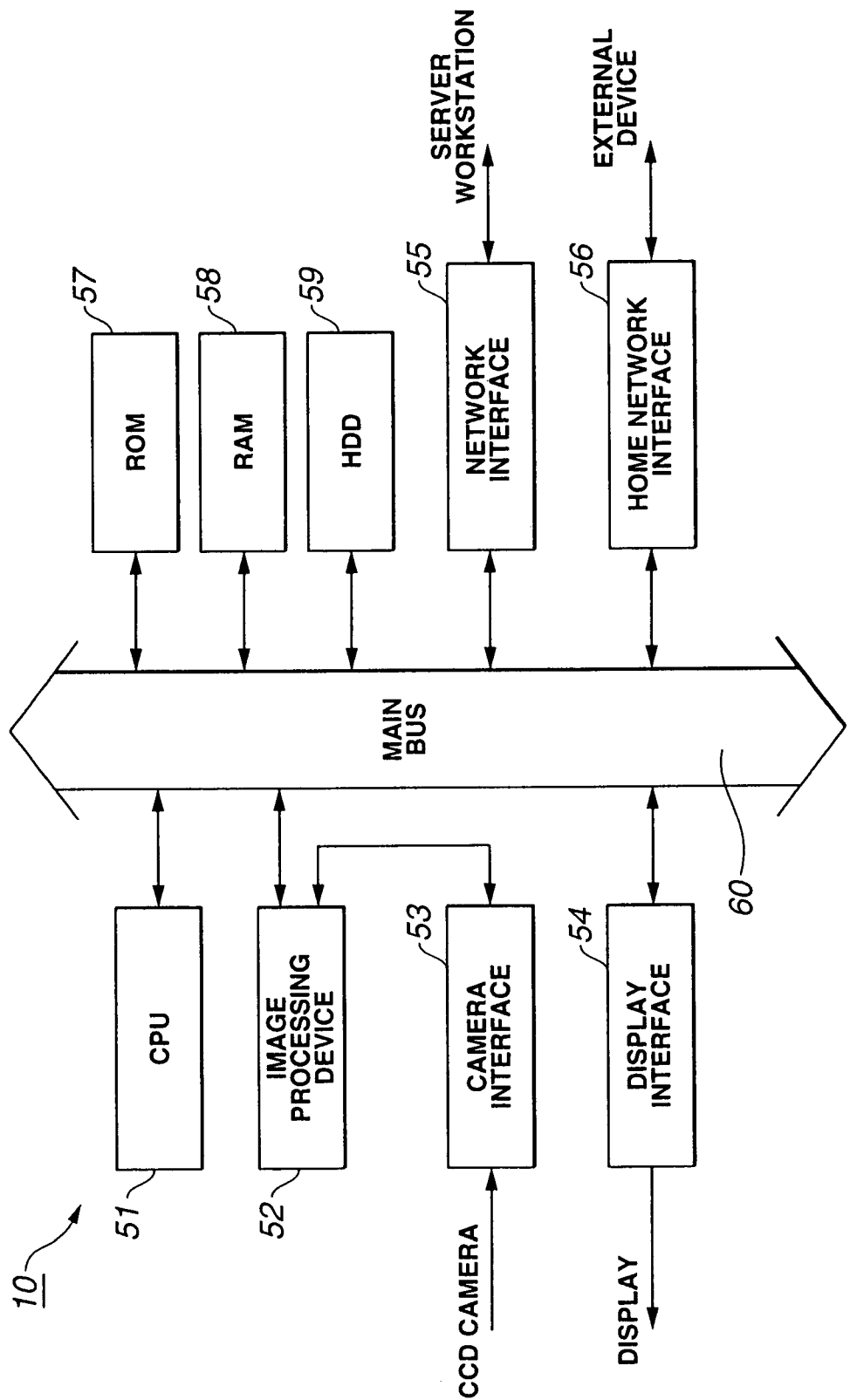
FIG. 7 is a block diagram showing a hardware structure of essential portions of the information inputting and specifying apparatus.

Referring to FIG. 7, the information inputting and specifying device 10 is made up by a CPU (Central Processing Unit) 51, an image processing, unit 52, a camera interface 53, a display interface 54, a network interface 55, a home network interface 56, a ROM (Read-Only Memory) 57, a RAM (Random-Access Memory) 58, an HDD (Hard Disc Device) 59 and a main bus 60.

The CPU 51 exercises controls based on a system program stored in the ROM 57 or a program transferred to the RAM 58. The CPU 51 implements a portion of the functions of the image recognition unit 12 and a portion of the functions of the controller 13.

The image processing unit 52 is supplied through camera interface 53 with an image picked up by the CCD viewer camera 21 to perform various image processing operations, such as the processing of image recognition. This image processing unit 52 partially implements the functions of the image recognition unit 12 of FIG. 1. The camera interface 53 is supplied with an image picked up by the CCD viewer camera 21 and transforms the input image to an image complying with the signal format which is in keeping with the image processing unit 52 to output the resulting image. The display interface 54 is supplied with the display data processed by the image processing unit 52 and transforms the data into signals which are in keeping with the viewer 52A to output the resulting signals. The display interface 54 and the viewer 25A implement a portion of the functions of the outputting unit 15 of FIG. 1.

The network interface 55 is an interface for connection to a server station. By this interface, connection may be made to an external network. The network interface 55 is a device partially implementing the functions of the information distributing unit 16 and the communication network 18 of FIG. 1.

The home network interface 56 is an interface for connection to the external device 17. The CPU 51 controls the external equipment through this home network interface 56. The home network interface 56 and the external equipment are devices partially implementing the functions of the external device 17 and the communication network 19.

In the ROM 57, there are stored programs or data necessary for the CPU 51 to execute various processing operations. The RAM 58 transiently holds programs or data necessary for the CPU 51 to execute various processing operations. The ROM 57 and the RAM 58 implement portions of the functions of the controller 13 of FIG. 1.

The HDD 59 holds the information correlated to the information inputting sheet 29. The HDD 59 is a device implementing the functions of the storage unit 14 of FIG. 1.

The function of automatically reading out and recognizing the information corresponding to the object, as the object identification code on the surface of each object indicating the set of the information corresponding to the object and which is stored in the storage system in the information system, and the information for specifying the information in the information set corresponding to the object, are matched to a position on the object surface for identifying the object, and of specifying the position on the display unit 29B of the control contents associated with the equipment type or the equipment to instruct and select the information set in the storage unit and the information in the information set, may be loaded on for example the portable telephone set for operation as the user interface by visual interaction.

In this interface, (1) letter/character definition is by employing the letters or characters used in the printed matter or handwritten by the user and (2) the letters or characters in need of letter/character inputting are captured using a camera annexed to the portable telephone set. Since the meaning and attributes of the letters or characters captured are multifarious, as for example WEB site addresses, letters or characters retrieved, or filenames, the processing to be performed is specified in advance of inputting, such as by employing the figure codes, such as the Umark figure codes in the information inputting sheet 29.

Figure 8:
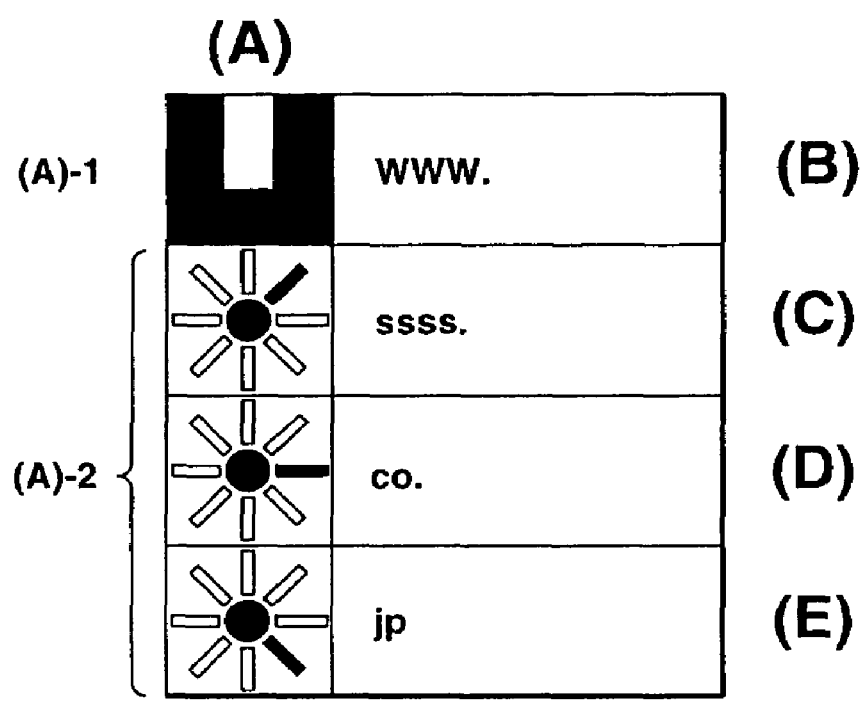
FIG. 8 schematically shows the definition of an architecture of a letter/character inputting interface operating as an user interface by visual interaction at a portable terminal.
Figure 9:
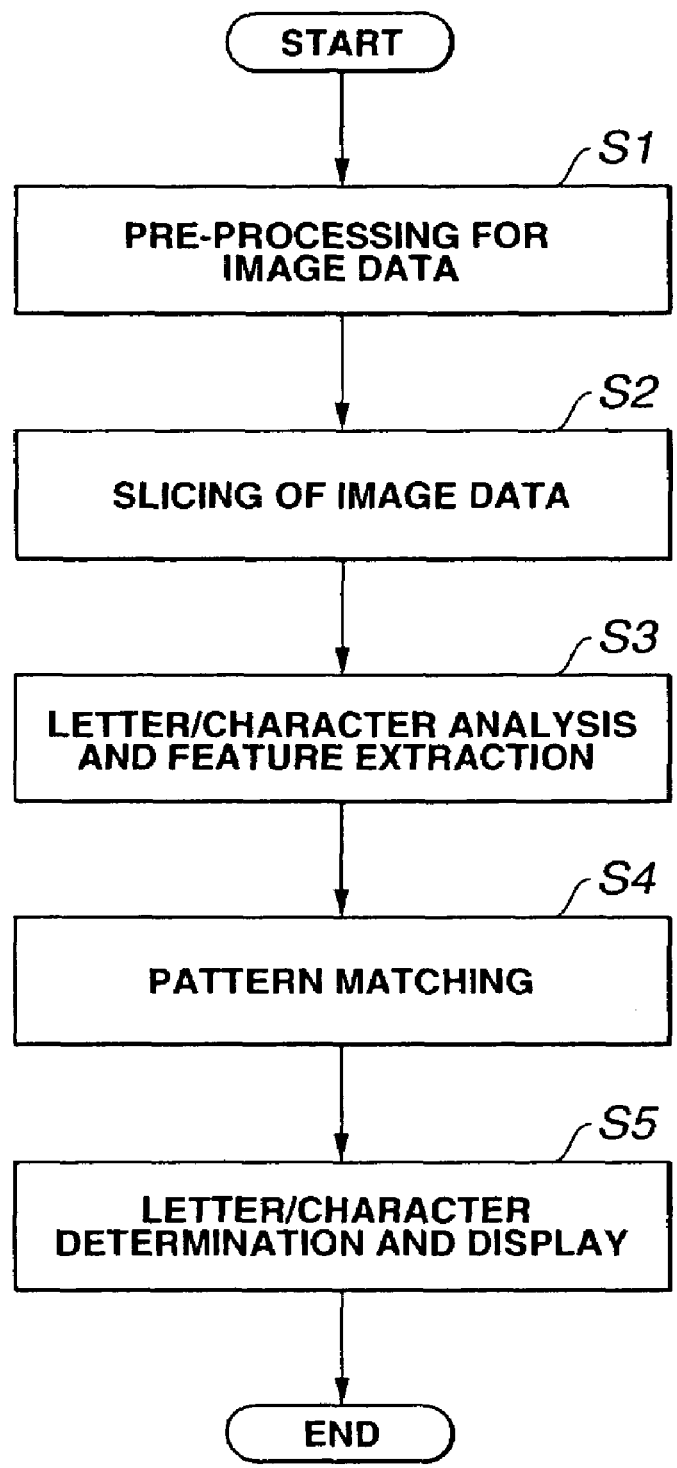
FIG. 9 is a flowchart showing a processing sequence of letter/character recognition by a pattern matching method.

That is, the architecture of the letter/character inputting interface is defined as shown for example in FIG. 8.

In FIG. 8, (A) specifies figure codes for letter/character processing in http, ftp, telnet of file. In FIGS. 8, (B), (C) and (D) state for example the node names of the URL, names of the organizations and types of the organizations, respectively. FIG. 8(E) is an area stating the nation symbols.

Figure 2:
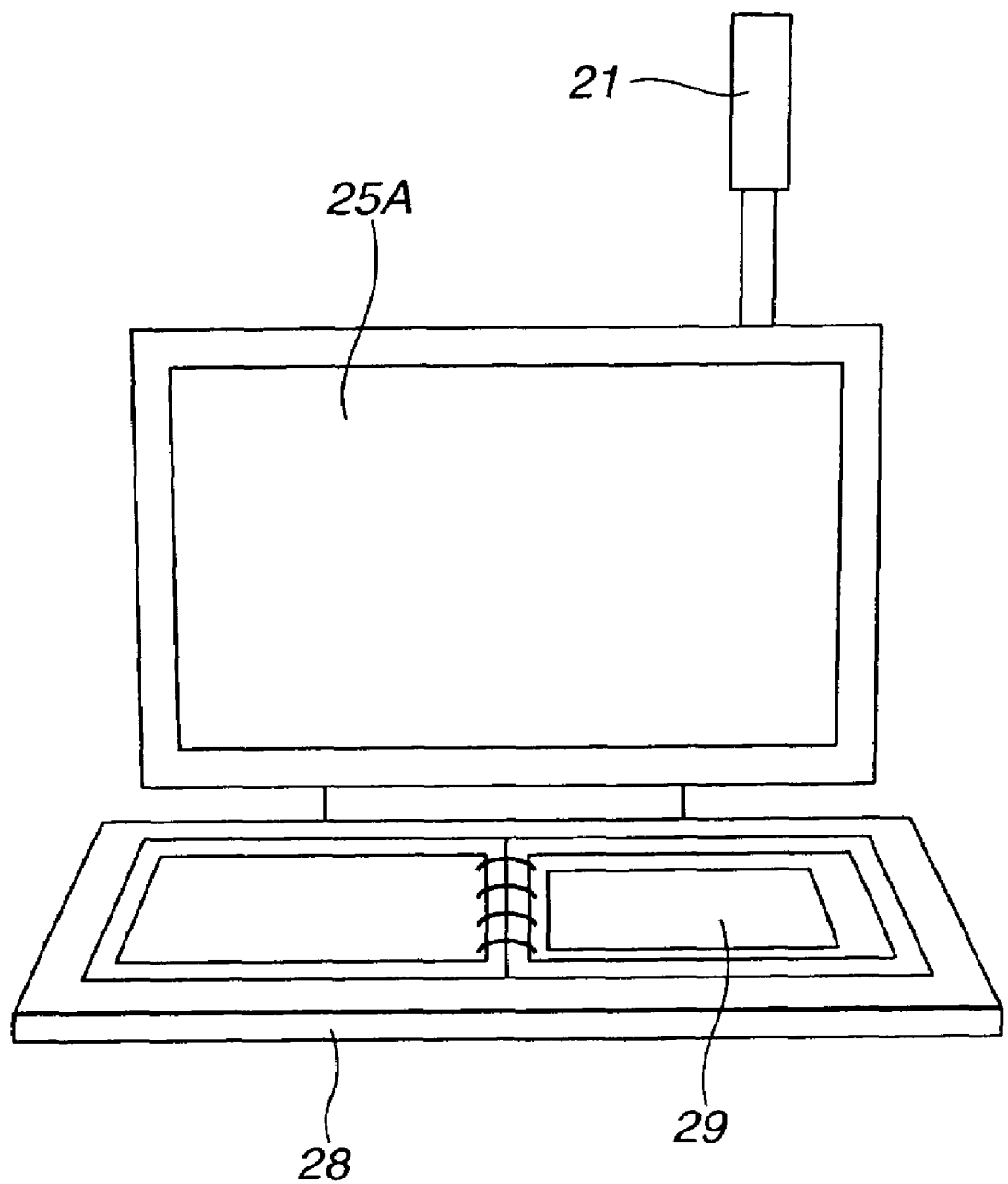
FIG. 2 is a schematic perspective view showing the information inputting and specifying apparatus.

That is, the letter/character processing codes are basically made up by the code detection figures of FIG. 8(A)-1 and the Umark code figures of FIG. 8(A)-2.

The code detection figures are used as an index for normalizing the figure codes by extracting the figure codes specifying the letter/character processing attributes from a two-dimensional: image picked up by a camera and by carrying out the threshold value decision or correction by rotation by a so-called P-tile method in which a threshold value T for binary coding is determined so that, when the gross area ratio in an image of the object is known, the proportion of a pixel 1 in a bi-value image will be equal to P.

For the normalized figure codes, each figure code of FIG. 8(A)-2 is separated and the center of gravity of each figure code is calculated by image processing. Eight direction fitting is then performed from the center of gravity vector for conversion to eight sorts of digital data.

This figure code recognition program is built into the portable telephone set so that the letter/character processing program will be booted the instant the figure codes by the camera are recognized.

The pattern matching method, for example, is applied as a method for letter/character recognition for performing letter/character extraction using the camera.

In the letter/character recognition by the pattern matching method, processing is carried out in the sequence of image data pre-processing (step S1), image data slicing (step S2), letter/character analysis and feature extraction (step S3), letter/character pattern matching (step S4) and letter/character decision and display (step S5).

Figure 10:
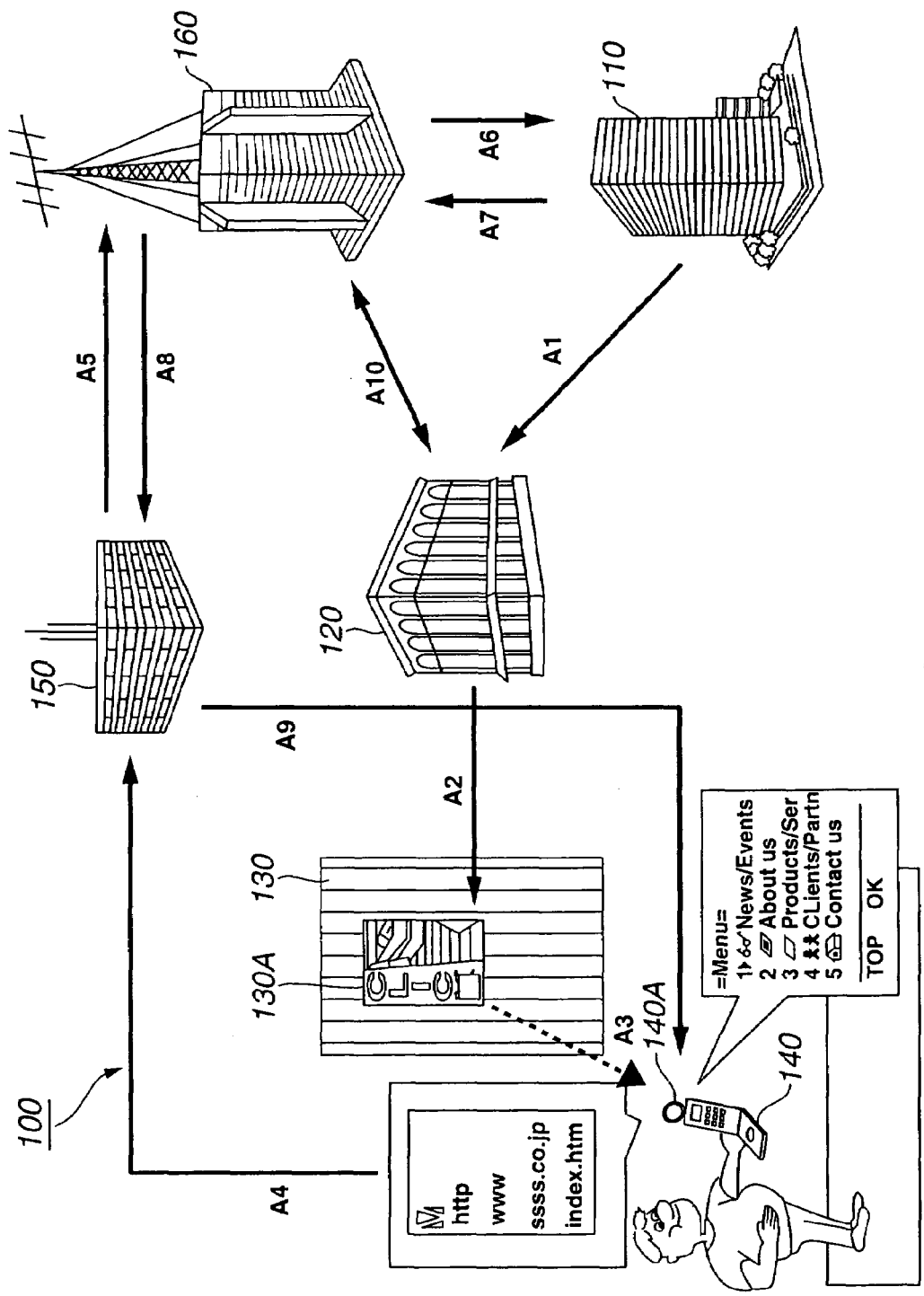
FIG. 10 shows an illustrative structure of a data servicing system employing a portable terminal having a figure code recognition program installed therein.

By the portable telephone set, which has the figure code recognition program installed therein, being used in increasing numbers, the data services as shown for example in FIG. 10 may be rendered.

That is, in a data servicing system 100, shown in FIG. 10, a provider 110 pays licensing fee in a net bank 120 (A1).

The net bank 120 distributes a license to the provider 110 (A2).

The contents of a seal 120A of the URL address, pasted on a poster 130, are captured by a CCD viewer camera 140A of a portable telephone set 140 (A3).

The portable telephone set 140 automatically transmits the so captured URL address to a base station 150 (A4).

The base station 150 transmits the URL address to an exchange station 160 of a carrier (A5).

The exchange station 160 of the carrier transmits the URL address to the provider 110 via e.g., Internet (A6).

The provider 110 transmits the HTML (HDML) to the exchange station 160 of the carrier (A7).

The exchange station 160 of the carrier trims the received HTML (HDML) to transmit the data to the base station 150 (A8).

The base station 150 transmits data to the portable telephone set 140 (A9).

The net bank 120 tolls the access fee (A10).

Figure 11:
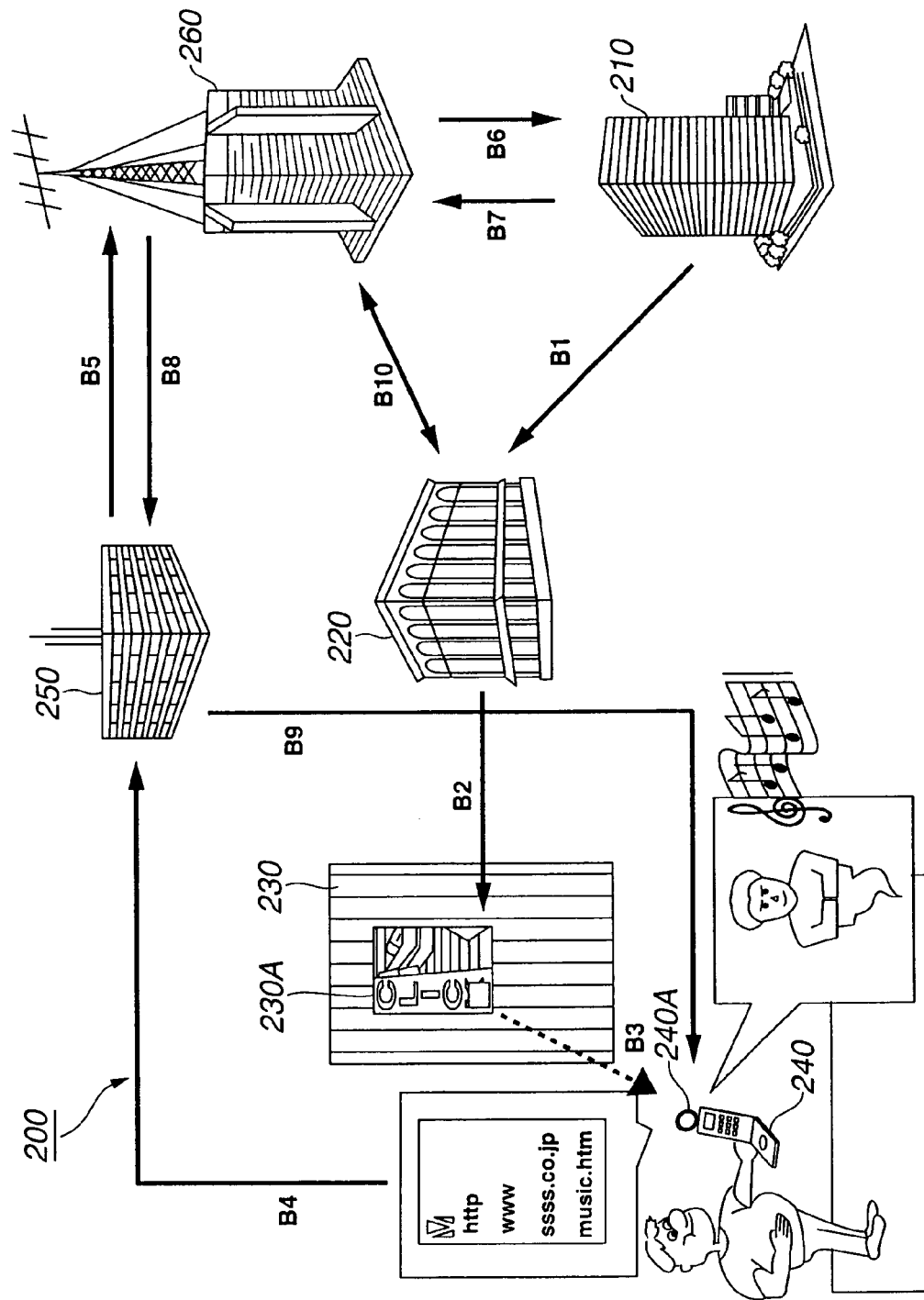
FIG. 11 shows an illustrative structure of a multi-media data servicing system employing a portable terminal having the figure code recognition program installed therein.

The multi-media services may also be rendered, as shown for example in FIG. 11.

That is, in multi-media service system 200, shown in. FIG. 11, a provider 210 pays the license fee to the net bank 220 (B1).

The net bank 220 distributes the license to the provider 210 (B2).

The contents of a seal 230A of the URL address, such as short movie (game or picture) pasted on the poster 230, are captured by a CCD viewer camera 240A of a portable telephone set 240 (B3).

The portable telephone set 240 automatically transmits the captured URL address to a base station 250 (B4).

The base station 250 transmits the URL address to a carrier exchange station 260 (B5).

The carrier exchange station 260 transmits the URL address to the provider 210 over e.g., the Internet (B6).

The provider 210 transmits the HTML (HDML) to the carrier exchange station 260 (B7).

The carrier exchange station 260 trims the received HTML (HDML) to transmit the data to a relevant base station 250 (B8).

The base station 250 transmits a multi-media object to the portable telephone set 240 (B9).

The net bank 220 tolls the access fee (B10).

Figure 12:
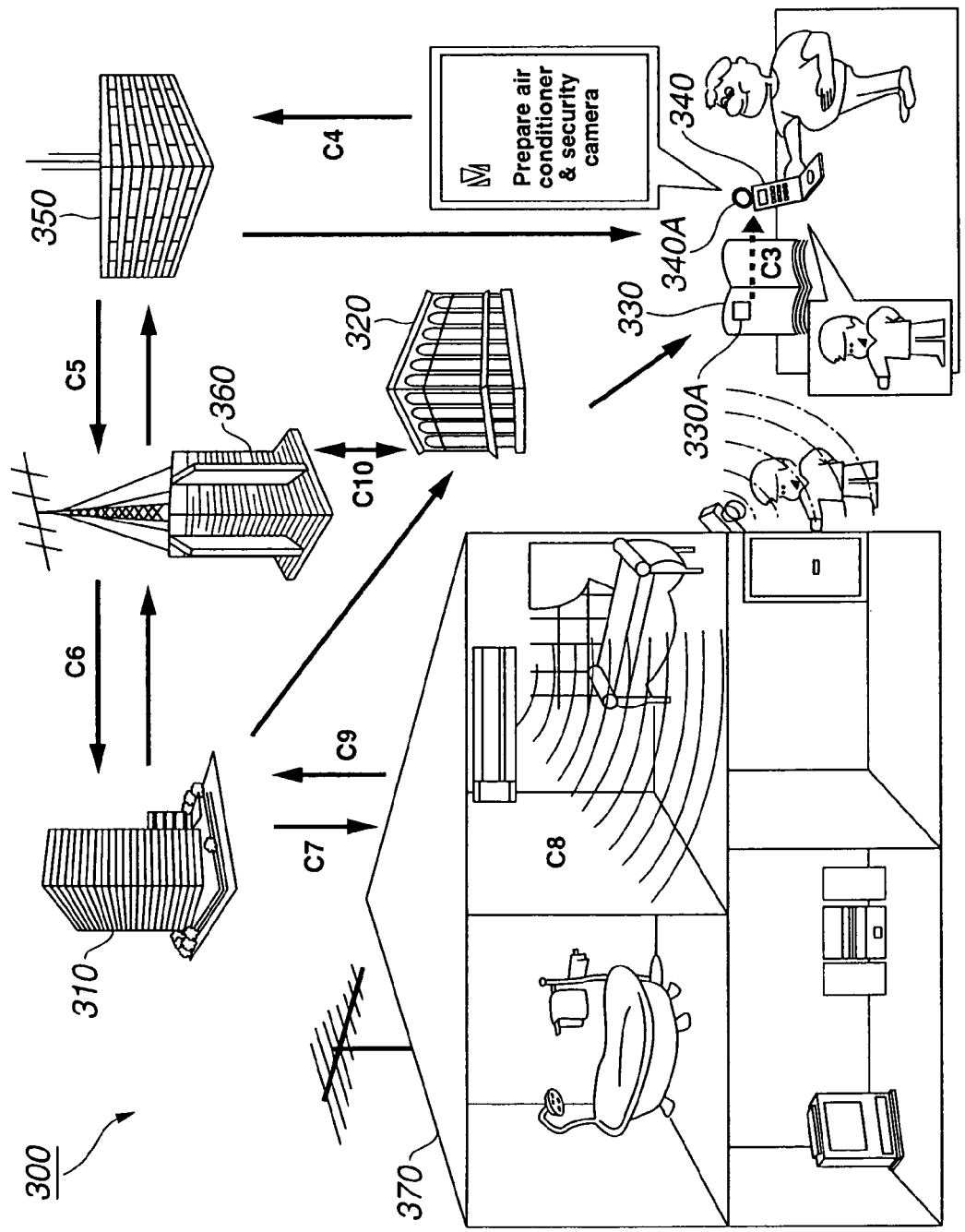
FIG. 12 shows an illustrative structure of a electrical household equipment control servicing system employing a portable terminal having the figure code recognition program installed therein.

Moreover, electrical household equipment control services, shown for example in FIG. 12, may also be rendered.

That is, in an electrical household equipment control service system 300, shown in FIG. 12, a provider 310 pays the license fee to a net bank 320 (C1).

The net bank 320 distributes a license to the provider 310 (C2).

The contents of the electrical household equipment control information 330A, pasted to a book (memo book) 330, are captured by a CCD viewer camera 340A of a portable telephone set 340 (C3).

The portable telephone set 340 automatically transmits the captured electrical household equipment control information to a base station 350 (C4).

The base station 350 transmits the electrical household equipment control information to a carrier exchange station 360 (C5).

The carrier exchange station 360 authenticates the received electrical household equipment control information and, if the information is authenticated, the carrier exchange station transmits the electrical household equipment control information to a relevant provider 310 (C6).

The provider 310 transmits the electrical household equipment control information to a customer 370 (C7).

The customer 370 controls the relevant electrical household equipment based on the received electrical household equipment control information (C8).

An image of a security camera of the customer 370 is sent (C9).

The net bank 320 tolls the access fee (C10).

Figure 13:
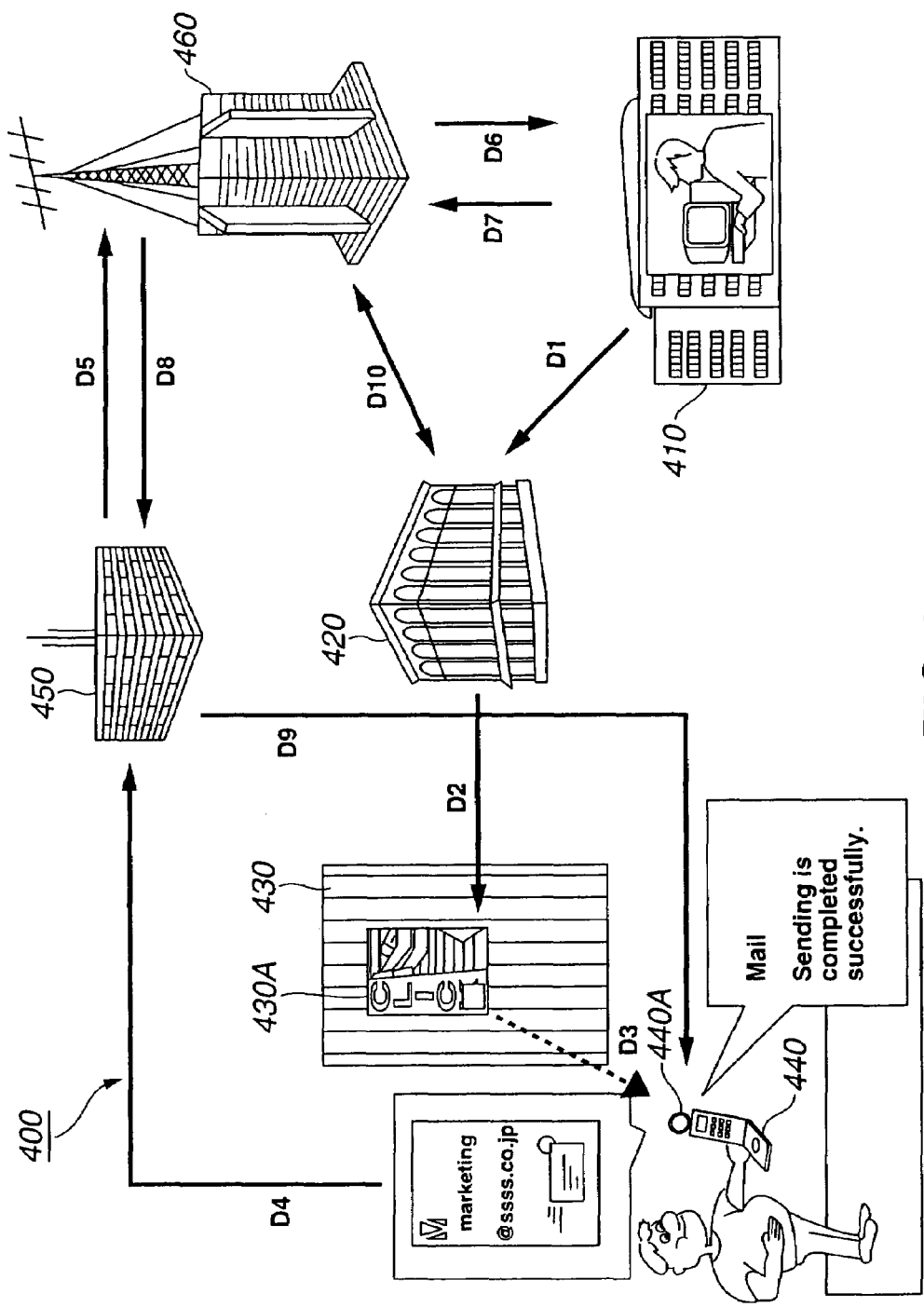
FIG. 13 shows an illustrative structure of a mail servicing system employing a portable terminal having the figure code recognition program installed therein.

Additionally, the mail services shown for example in FIG. 13 may also be rendered.

That is, in a mail servicing system 400, shown in FIG. 13, a provider 410 pays the license fee to a net bank 420 (D1).

The net bank 420 distributes a license to the provider 410 (D2).

The contents of an E-mail address 430A, pasted to a poster 430, are captured by a CCD camera 440A of a portable telephone set 440 (D3).

If the speech is input, the speech is automatically transformed into letters or characters to prepare an E-mail. The E-mail prepared may be transmitted to a base station 450 on pressing a transmission key of the portable telephone set 440 (D4).

The base station 450 transmits an E-mail to a carrier exchange station 460 (D5).

The carrier exchange station 460 transmits an E-mail to a relevant customer address over e.g. the Internet (D6).

When the transmission is terminated as regularly, a message indicating the completion of transmission is transmitted to the carrier exchange station 460 (D7).

The carrier exchange station 460 transmits the received completion message to the relevant base station 450 (D8).

The base station 450 transmits the transmission completion message to the relevant portable telephone set 440 (D9).

The net bank 420 tolls the access fee (D10).

Figure 14:
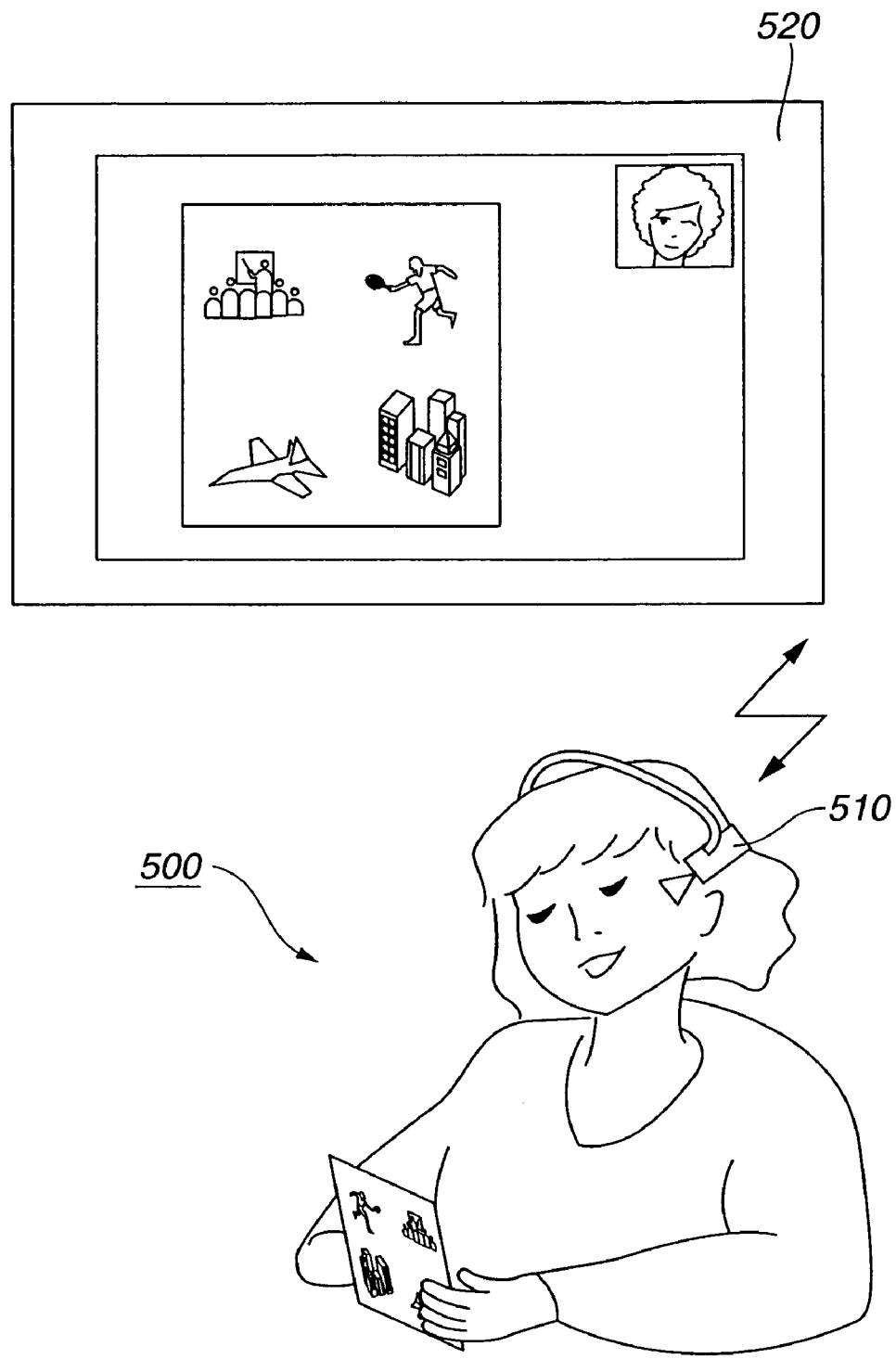
FIG. 14 is a perspective view showing the overall configuration of a viewing tablet system.

The function of automatically reading out and recognizing the information corresponding to the object for identifying the object, as an object identification code on the object surface indicating the information in the set of the information corresponding to the object and which is stored in the storage system in the information system to the surface of each object, and the information for specifying the information in the information set corresponding to the object, are matched to the position on the object surface, and the function specifying and the function of selecting the information set in the storage unit, and the information in the information set, by specifying a position on the object surface, may be exploited to construct a viewing tablet system 500 shown for example in FIG. 14.

This viewing tablet system 500 is made up by a loaded type wireless camera 510, that is able to capture an image at all times from a line of sight position of the viewer, and an image recognition presentation device 520 dynamically comprehending the contents of operations and instructions to the object in keeping with the movement of the field of view of the user to furnish adequate information to the user.

In this viewing tablet system 500, the user loads the wireless camera 510 on the line of sight position, so that, as the line of sight is moved, the object may be automatically recognized to issue operational instructions within the field of view. That is, by employing the loaded type wireless camera 510, the image of the object can be dynamically grasped from the viewing point position of the user.

In this viewing table system 500, the user sets a space code sheet at a position on an object, such as book or paper sheet, added by the Umark category set. The user then causes the Umark category code of the object to be recognized by the loaded type wireless camera 510 within the field of view. When further the user touches a specified portion of the paper sheet with a finger by way of giving an input and instructions, the finger and the partial image of the paper sheet are input from the loaded type wireless camera 510 to the image recognition presentation device 520. The image recognition presentation device 520 then recognizes this partial image as an image to verify the contents of the user's instructions to furnish the optimum information.

According to the present invention, described above, an object lying in the user's living environment is matched to a set of the information stored in an information system, whilst an object discriminating code indicating the information set matched to the object and which is stored in a storage device of the information system is added to the surface of each object, so that the information for specifying the information in the information set corresponding to the object is matched to the position on the object surface, in such a manner that the information matched to the object is automatically read out and recognized to identify the object, and also in such a manner that the information set in the storage device and the information in the information set will be specified and selected by specifying the position on the object surface. In this manner, the knowledge stored in an information system may be freely accessed and exploited in a manner not producing breaking points.

In the above-described information inputting and specifying device 10, the pattern of the object of recognition, recorded on the information inputting sheet 29, and the access specifying pattern, provided by for example the user's finger, are imaged by the imaging unit 11, the information for specifying the information in the information set, corresponding to the object, is matched to a position on the surface of the object, based on the imaging information, and the information corresponding to the object is automatically read out and recognized for identifying the object. Alternatively, the pattern of the object of recognition, recorded on the information inputting sheet 29, and the access specifying pattern, provided by the user's finger, may be directly recorded on the object surface.

Figure 15A:
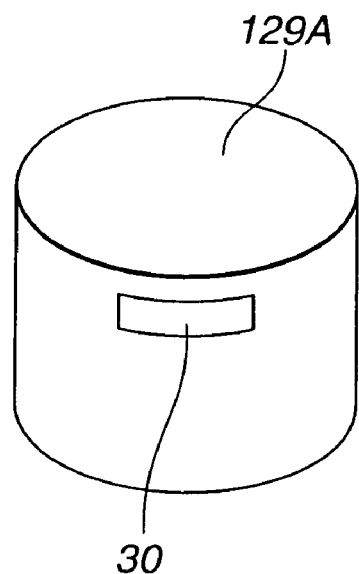
FIGS. 15A and 15B are schematic perspective views showing a columnar-shaped object and a triangular pyramid-shaped object, as picked up by an imaging unit of the information inputting specifying device.
Figure 15B:
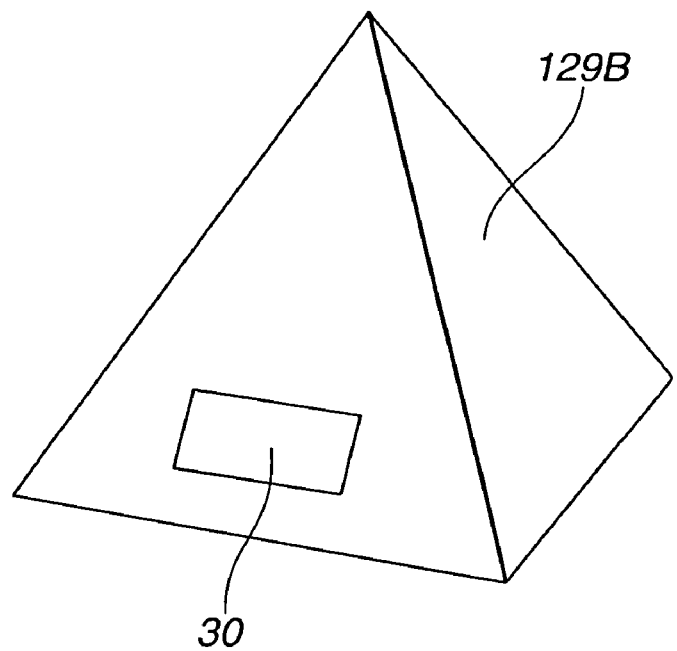

When the pattern of object recognition recorded on the object surface and the access specifying pattern provided by the user's finger are imaged by the imaging unit 11, the information for specifying the information in the information set, matched to the object, is matched to the position on the object surface, based on the imaging information, and the information corresponding to the object is automatically read out and recognized for identifying the object, the object shape is not limited to the sheet shape, such that an object identification code, specifically a Umark figure code 30, provided on the surface of a columnar object 129A, as shown in FIG. 15A, or an object identification code, specifically a Umark figure code 30, provided on the surface of a triangular pyramid-shaped object 129B, as shown in FIG. 15B, may be imaged by the imaging unit 11 for recognition.

Figure 16:
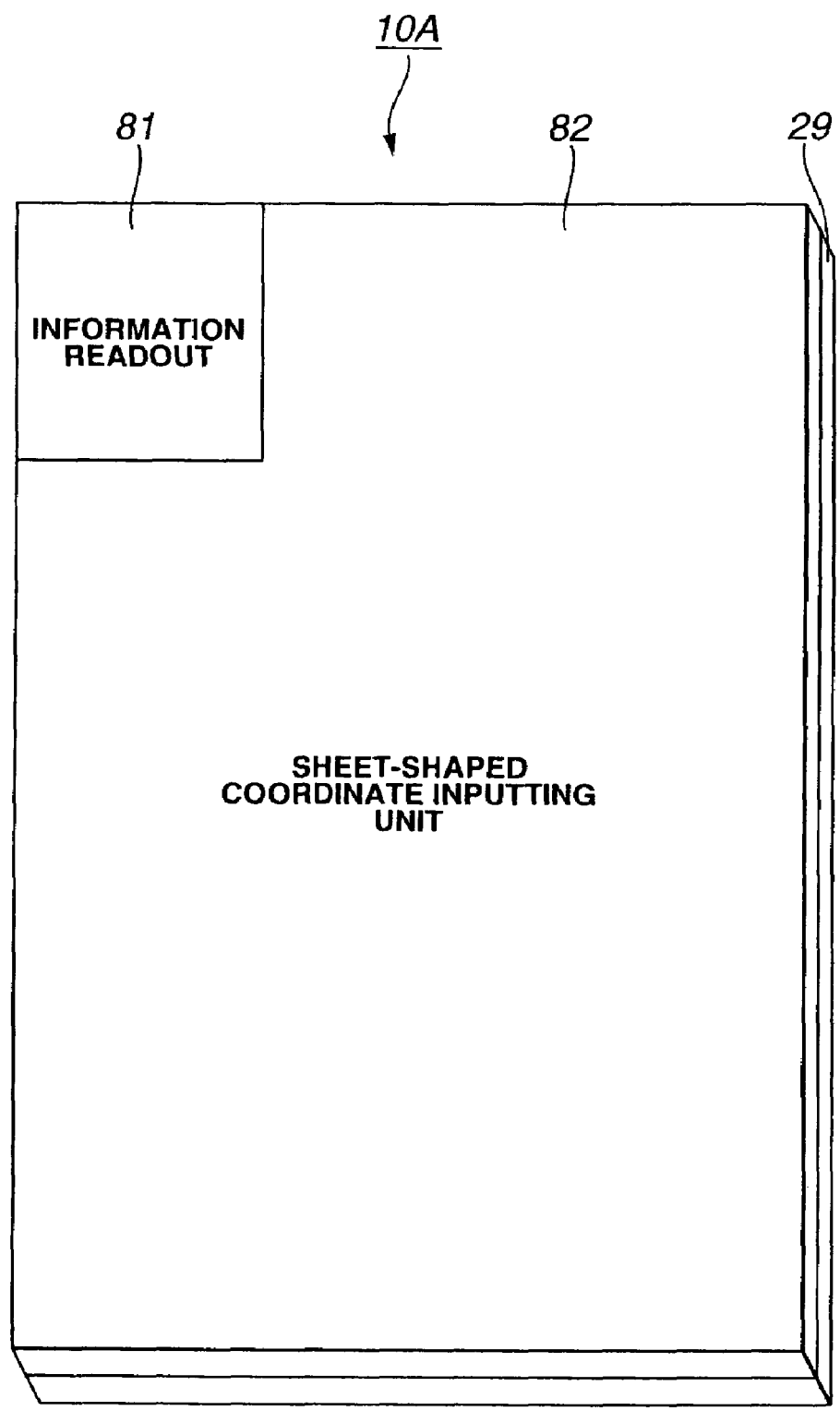
FIG. 16 is a schematic plan view of the information inputting specifying device having an optical information readout unit and a sheet-like coordinate inputting unit.
Figure 17:
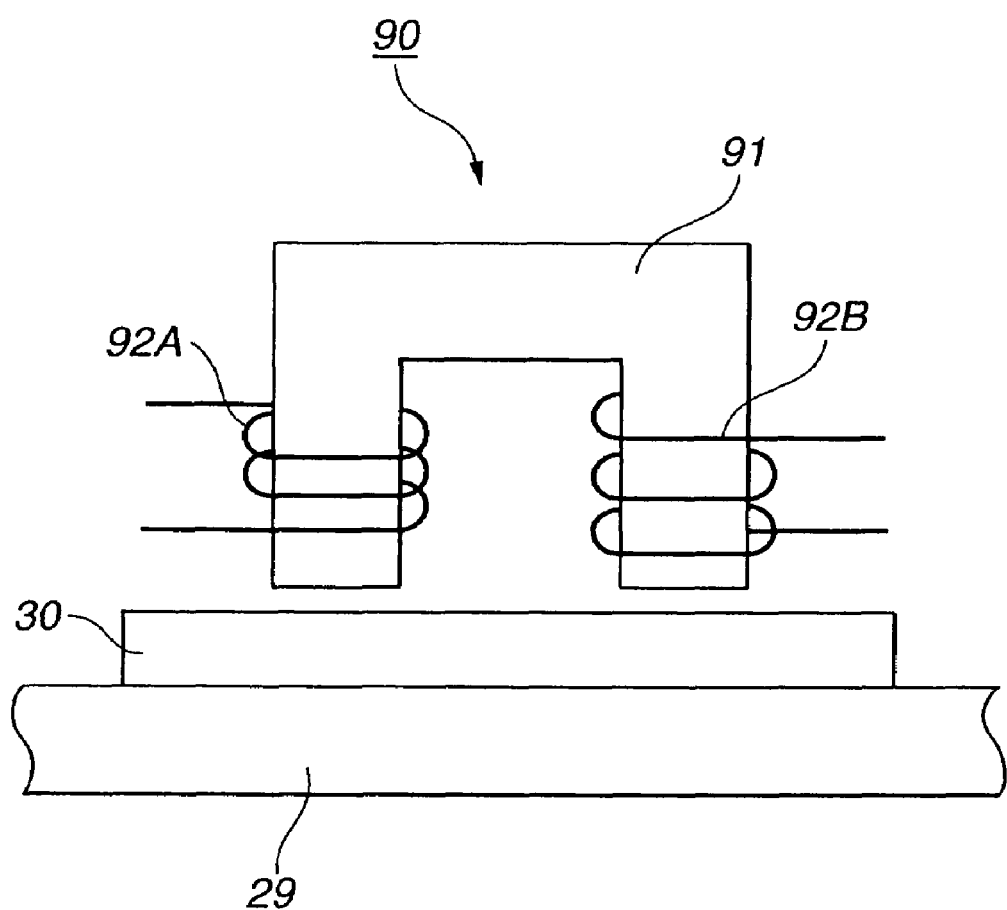
FIG. 17 is a schematic front view showing an electromagnetic element forming a basic unit of a magnetic information readout unit.

In the above-described information inputting and specifying device 10, the pattern of the object of recognition and the access specifying pattern, provided by for example the user's finger, are imaged by the imaging unit 11, the information for specifying the information in the information set, corresponding to the object, is matched to a position on the surface of the object, based on the imaging information, and the information corresponding to the object is automatically read out and recognized for identifying the object. It is also possible not to use the imaging unit 11 or the image recognition unit 12 and to read out the object identification code, optically readably recorded on the object surface, by an optical information readout unit 81, to input the position on the object to a sheet-shaped coordinate inputting unit 82, whereby the information for specifying the information in the information set corresponding to the object is matched to the position on the object surface and the information corresponding to the object may be automatically read out and recognized for identifying the object, as in the information inputting and specifying device 10A shown in FIG. 16.

This information inputting and specifying device 10A includes an optical information readout unit 81, such as a scanner, provided with a CCD camera or a CCD image sensor, for reading out the object identification code optically readably recorded on the object, such as the aforementioned information inputting sheet 29, that is the Umark figure code 30.

The information inputting and specifying device 10A also includes a sheet-shaped coordinate inputting unit 82, or a so-called touch panel, comprised of a matrix arrangement of a plurality of planar switches which may be turned on as a result of e.g., pressure application, to permit detection of the position information of the pressed portion on the sheet surface.

The sheet-shaped coordinate inputting unit 82 is formed of a sheet-like material, in which the electrical conductivity across its upper and lower surfaces is increased at the pressed area. The upper and lower surfaces of the sheet-shaped coordinate inputting unit are provided with two sets of conductors arranged to cross one another. The conductor sets provided on the upper and lower surfaces of the sheet-like material are connected to voltage dividing resistors extending to cross the respective line directions. The output current is detected at both ends of the voltage dividing resistors.

The sheet-shaped coordinate inputting unit 82 is formed of a transparent material or of a meshed material, so that, when the sheet-shaped coordinate inputting unit is used as it is set on an object, such as the aforementioned information inputting sheet 29, the underlying information inputting sheet 29 may be seen. It is noted that, if the sheet-shaped coordinate inputting unit 82 is opaque, the information inputting sheet 29 is placed in use on the sheet-shaped coordinate inputting unit 82.

In the information inputting and specifying device 10A, employing the sheet-shaped coordinate inputting unit 82, the respective pages affording the schematic information formulated as a booklet or a catalog may be formed by the information inputting sheet 29, and the schematic information may be correlated with the various detailed information stored in the information system. In this case, such a system may be constructed in which the book or catalog is first referenced as its pages are sequentially spread by way of giving a marking and the information inputting and specifying device 10A is overlapped with a corresponding page of the book or catalog to specify a necessary position on its surface to get to the detailed information. With this system, the operation of using the information stored in the information system may be made in a state close to the state of everyday life, thus assuring smoother information inputting and specifying operations.

If the object identification code, that is the Umark figure code 30, is recorded with a magnetic ink containing a high permeability material, a magnetic readout unit may be used in place of the optical information readout unit 81 in the information inputting and specifying device 10A.

Figure 18:
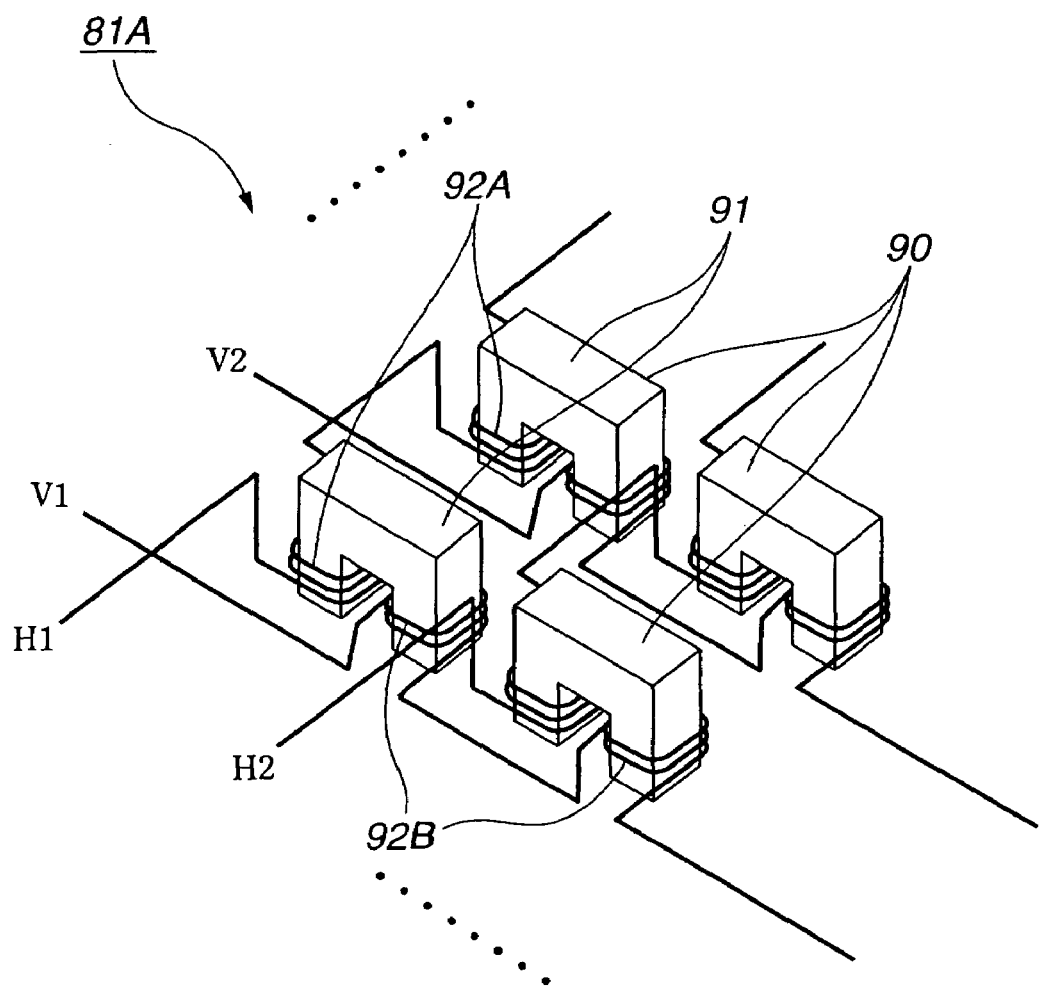
FIG. 18 is a schematic perspective view of a number of magnetic information readout units comprised of a two-dimensional matrix arrangement of a number of the electromagnetic elements as basic units.

An information readout unit for magnetically reading out the patterns formed by the magnetic ink, an electromagnetic unit 90, comprised of a core of a high permeability material, having a looped magnetic path partially cut away, and two coils 92A, 92B wound thereon. When the electromagnetic unit 90, as the basic unit, has its partially removed portion of the magnetic path directed to the surface of the information inputting sheet 29, having patterns recorded by the high permeability magnetic material, a closed magnetic path is formed by a pattern of the high magnetic permeability material, forming the Umark figure code 30, such that the mutual inductance is changed across the two coils 92A, 92B. Thus, by causing the current to flow through the coil 92A and by detecting the electrical signals induced in the other coil 92B, it is possible to detect whether or not the partially removed portion of the looped magnetic path faces the pattern by the high magnetic permeability material recorded on the information inputting sheet 29. The information readout unit 81A is so configured that a number of the electro-magnetic units 90, as the basic units, are arranged in a two-dimensional matric configuration, with the coils 92A being connected in series with one another in the vertical direction and with the coils 92B being connected in series with one another in the horizontal direction, as shown in FIG. 18.

With the information readout unit 81A, described above, the current is caused to flow through the coils H1, H2, . . . , connected in series with one another in the horizontal direction, and the voltage induced in the coils V1, V2, . . . , connected in series with one another in the vertical direction, is detected to read out the image of distribution of the pattern of the high magnetic permeability material without producing relative movement with respect to the information recording surface.

Meanwhile, the information readout unit 81A is to be seen through to permit the underlying information inputting sheet 29 to be viewed.

The invention claimed is:

1. An information inputting and specifying method comprising:

storing a meaning and attribute of a letter in a storage means;

reading out a figure code for the letter, indicating the meaning and attribute of the letter stored in said storage means, from a surface of an object;

recognizing the meaning and attribute of the letter on the basis of the figure code by use of figure code recognition means;

recognizing the letter on the basis of the figure code by booting a letter processing program corresponding to the meaning and attribute of the letter by use of letter recognition means; and controlling an external device on the basis of the result of recognition of the letter by use of controlling means, said figure code including a number of units, each unit having a circle mark and a plurality of rectangular marks arranged radially around the respective circle mark.

\* \* \* \* \*